(12) United States Patent
Young et al.

(10) Patent No.: US 7,769,147 B1
(45) Date of Patent: Aug. 3, 2010

(54) VOICE MESSAGING SYSTEM WITH ENHANCED CUSTOMIZABILITY

(75) Inventors: Timothy M. Young, Collegeville, PA (US); Steven J. Capriotti, Collegeville, PA (US); Steven Luzeski, Collegeville, PA (US); Barbara E. Osder, Glenside, PA (US)

(73) Assignee: Unisys Corporation, Blue Bell, PA (US)

( * ) Notice: Subject to any disclaimer, the term of this patent is extended or adjusted under 35 U.S.C. 154(b) by 1826 days.

(21) Appl. No.: 09/363,339

(22) Filed: Jul. 29, 1999

(51) Int. Cl.
*H04M 11/00* (2006.01)
(52) U.S. Cl. ............................ 379/88.18; 379/201.03
(58) Field of Classification Search ............ 379/201.03, 379/88.13, 88.23, 88.24, 88.18; 378/88.13, 378/88.16, 88.18, 88.23, 88.24, 88.25
See application file for complete search history.

(56) References Cited

U.S. PATENT DOCUMENTS

| | | | | |
|---|---|---|---|---|
| 4,652,700 A | * | 3/1987 | Matthews et al. | 379/88.26 |
| 5,243,643 A | * | 9/1993 | Sattar et al. | 379/88.23 |
| 5,323,452 A | | 6/1994 | Dickman et al. | 379/201 |
| 5,355,406 A | * | 10/1994 | Chencinski et al. | 379/88.27 |
| 5,724,406 A | * | 3/1998 | Juster | 379/88.13 |
| 6,094,239 A | * | 7/2000 | Weber | 348/734 |

\* cited by examiner

*Primary Examiner*—Simon Sing
(74) *Attorney, Agent, or Firm*—Robert P. Marley

(57) ABSTRACT

A telephony-based messaging system application is built for use by a particular customer. The application is stored on a computer readable medium and includes a set of modules, where each module comprises call flows, code and a Customization List. The Customization List includes one or more tables each having a list of names and a modifiable list of corresponding DTMF signal identifiers. With this architecture, the particular customer is permitted to change the mapping between caller-entered DTMF signals and the corresponding actions taken by the messaging system by modifying the list of DTMF signal identifiers, i.e., without modifying the call flows or code.

25 Claims, 10 Drawing Sheets

VOICE MESSAGING SYSTEM WITH ENHANCED CUSTOMIZABILITY

FIELD OF THE INVENTION

The present invention relates generally to telephony-based messaging systems and interactive voice response (IVR) systems, and more particularly to a method, system and software product for constructing a messaging system in such a way as to make it easily and efficiently customizable to meet the diverse requirements of customers.

BACKGROUND OF THE INVENTION

Telephony-based messaging systems that provide voice, fax and/or e-mail messaging capabilities are well known. FIG. 1 illustrates an exemplary messaging system developed by Unisys Corporation, Blue Bell, Pa., the assignee of the present invention. The system of FIG. 1 comprises multiple servers (which may be implemented, e.g., with A-Series™ or Clearpath™ computers offered by Unisys Corporation) each supporting a network applications platform (NAP), which provides an underlying platform for storage and retrieval of messages, and a messaging application running on the platform. A voice mail application, such as the Unisys Universal Voice Messaging System (UVMS), is an example of a messaging application that runs on the messaging platform. The UVMS application determines how calls to the messaging system are handled, what prompts are played to callers, and which features are available. Such applications typically maintain a database of subscribers who have "mailboxes" on the system. The messaging platform interfaces to a telephone network through a Network Interface Unit (NIU) or Telephony Services Platform (TSP), which is a form of NIU. Received messages are stored by the messaging platform in a local message store, or voice file.

The network applications platform, or NAP, may be located at a local telephone company connected to one or more central offices or switches, or could alternatively be located on the premises of a customer, such as a large or medium-sized company. In the latter case, the NAP would typically be connected to a private branch exchange (PBX) instead of directly to a Public Switched Telephone Network (PSTN) 16 as shown in FIG. 1.

In the exemplary system shown in FIG. 1, a first node of the system comprises a server/NAP 10a, voice file and database 12a and NIU 14a. Similarly, a second node comprises a server/NAP 10b, voice file and database 12b and NIU 14b; and a third node comprises a server/NAP 10c, voice file and database 12c and NIU 14c. The first node, e.g., could be responsible for a predefined geographic area encompassing hundreds of thousands of subscribers, or simply for a predefined set of telephone lines or circuits. The respective nodes are separately coupled to a PSTN 16 and are thereby made accessible to their subscribers. Moreover, subscribers of one node can employ messaging to transfer copies of messages (such as voice messages) to subscribers of another node.

In use, if a subscriber is not available when an incoming call is received, the PSTN forwards the call to the messaging system, which typically allows the caller to record a message and then stores the message for later retrieval by the caller. A key, or token, returned to the messaging application uniquely identifies the stored message data within the message store. This key can be used at a later time to retrieve the message from the message store for playback to the subscriber.

Further background information concerning the construction and operation of messaging systems, and particularly systems employing a Network Applications Platform for interfacing a telephone network and network applications running on an enterprise server, may be found in the following patents and copending patent applications:

U.S. Pat. No. 5,133,004, Jul. 21, 1992, "Digital Computer Platform for Supporting Telephone Network Applications";

U.S. Pat. No. 5,138,710, Aug. 11, 1992, "Apparatus and Method for Providing Recoverability in Mass Storage Data Base Systems Without Audit Trail Mechanisms";

U.S. Pat. No. 5,384,829, Jan. 24, 1995, "Digital Computer Platform for Supporting Telephone Network Applications";

U.S. Pat. No. 5,323,450, Jun. 21, 1994, "Telephone Network Applications Platform for Supporting Facsimile Applications";

U.S. Pat. No. 5,494,606, Feb. 20, 1996, "Multi-Lingual Prompt Management System for a Network Applications Platform";

U.S. Pat. No. 5,633,916, May 27, 1997, "Universal Messaging Service Using Single Voice Grade Telephone Line Within a Client/Server Architecture";

U.S. patent application Ser. No. 08/944,924, filed Oct. 6, 1997, "Enhanced Multi-Lingual Prompt Management in a Voice Messaging System With Support for Speech Recognition";

U.S. patent application Ser. No. 08/964,744, filed Nov. 5, 1997, "Methods and Apparatus for Providing External Access to Executable Call Flows of a Network Application";

U.S. patent application Ser. No. 08/987,571, filed Dec. 11, 1997, "Multiple Language Electronic Mail Notification of Received Voice and/or Fax Messages";

U.S. patent application Ser. No. 09/094,126, filed Jun. 9, 1998, titled "Universal Messaging System Providing Integrated Voice, Data and Fax Messaging Services to PC/Web-based Clients, Including a Session Manager for Maintaining a Session Between a Messaging Platform and the Web-based Clients";

U.S. patent application Ser. No. 09/093,593, filed Jun. 9, 1998, titled "Universal Messaging System Providing Integrated Voice, Data and Fax Messaging Services to PC/Web-based Clients, Including a Content Manager for Receiving Information from Content Providers and Formatting the Same into Multimedia Containers for Distribution to Web-based Clients";

U.S. patent application Ser. No. 09/094,266, filed Jun. 9, 1998, titled "Universal Messaging System Providing Integrated Voice, Data and Fax Messaging Services to PC/Web-based Clients, Including a Large Object Server for Efficiently Distributing Voice/Fax Messages to Web-based Clients";

U.S. patent application Ser. No. 09/094,026, filed Jun. 9, 1998, "System and Method for Integrating Notification Functions of Two Messaging Systems in a Universal Messaging Solution";

U.S. patent application Ser. No. 09/161,214, filed Sep. 25, 1998, "Multiple Node Messaging System Wherein Nodes Have Shared Access To Message Stores Of Other Nodes"; and U.S. patent application Ser. No. 09/307,014, filed May 7, 1999, "Inter-System Call Transfer".

The present invention particularly addresses a problem that arises in connection with the distribution of voice messaging applications (such as UVMS) to customers with diverse needs and desires, e.g., with regard to the manner in which the system will interact with callers. For example, one customer might be the national telephone company in a country in which rotary phones are commonly used. Since rotary phones do not include a pound (#) key, this customer would require that the delimiter list not include the # key (the delimiter list is the list of DTMF tones or key presses a caller can use to signal the end of a caller input string). Another example is where a particular customer simply prefers different call flow sequences or functions than the ones being offered (e.g., the customer wants to reverse the order in which messages are reviewed, say, from first-in-first-out to last-in-first-out). Yet another example is where the customer requests a different list of DTMF tones/key presses a caller can use to interrupt the playing of a prompt (this list is referred to as a break list). With current systems, such diverse requirements are handled by modifying the application code as required for each different incarnation of the system. This solution, however, is unsatisfactory since it creates a complex maintenance dilemma. On the one hand, it is desirable to build and support one standard product for all customers, but on the other hand it is also desirable to permit customers to impart their requirements on the system, which in turn results in changes to the standard product. The changes may be simple in nature but the maintenance of a set of changes to the standard product for every customer can nonetheless become unduly burdensome and expensive. To deal with the customizations, it is possible to cut off from the standard product at some point and develop and maintain an independent development stream for each customer. This solution, however, is similarly expensive and inefficient.

SUMMARY OF THE INVENTION

The present invention provides a way to construct a voice messaging system application that can be efficiently and inexpensively "customized" in accordance with the diverse requirements of customers. The invention meets this need by providing a software product that permits a modular, base version of the voice messaging application to be constructed. The base version of the application is designed to be easily customized as needed, on a module by module basis, to meet the particular needs of individual customers. It is envisioned, for example, that the base version would be customized around the world by distributors/subsidiaries of the maker of the voice messaging system. In other words, in typical situations, the customers would not perform the customization process themselves, but rather this process would be performed as a service by an organization having a business relationship with the vendor of the base version of the voice messaging system. In this regard, a presently preferred implementation utilizes a "project and build" process by which a subsidiary or like business partner could create several customized versions of the messaging application from a base version and then "build" the desired customized version when needed. (As explained below, the build process creates files for a module and includes the use of one or more Customization Lists to create files for a specific customization.)

One exemplary implementation of this invention is a software product for developing and modifying call flows for NAP telephony applications, including voice mail applications, bank by phone applications, and the like. The inventive software product provides a set of Customization Lists used to tailor a set of call flows to the needs of a particular customer. The call flows, code and Customization Lists (for each customization) relating to a particular function are organized into modules. The presently preferred form of a Customization List is a set of tables, with one table for each of the following: Result List Names, Break List Names, Delimiter List Names, and Double-Digit List Names.

The Customization List(s) for a module is/are stored with the module, thus permitting the modules to be built independently. For instance, a developer can select a customization and build a module for that customization. The build process creates files for a Service Module or application, and includes the use of the Customization List(s) to create files for a specific customization. (Service Modules are described below.) Therefore, a module for a specific customer could comprise a standard module "compiled" with the appropriate Customization List(s), and the output of this "build" or "compile" is a unique set of files that can be loaded (e.g., by the corresponding runtime environment) during application initialization.

Other features and aspects of the present invention are described below.

BRIEF DESCRIPTION OF THE DRAWINGS

The foregoing summary and the following detailed description of presently preferred embodiments are better understood when read in conjunction with the appended drawings, in which.

DETAILED DESCRIPTION OF PREFERRED EMBODIMENTS

The present invention may be implemented in a software product that provides a development environment and tools for creating telephony-based messaging applications such as, e.g., voice mail and bank by phone. One such software product is Unisys' NAPTool product. Since the NAPTool product represents a presently preferred context in which the present invention may be implemented, we provide below a brief overview of the network applications and how they are developed with the NAPTool product. Similarly, since the messaging applications developed with NAPTool are designed to run on NAP-based systems, we also provide a brief overview of NAP. A detailed description of one exemplary embodiment of the present invention follows these overviews.

Network Applications and NAPTool

The basic elements of a telephony application include call flows, functions and prompts. Call flows define the personality of the application, i.e., the logical flow of the application interface to the caller (the person that dialed a phone number and was transferred to the telephony application in question). Functions represent the software building blocks employed to implement the desired call flow functionality. A function is computer code and may involve access to an application database. Each function produces a result that determines the path of the associated call flow. Prompts are logical groups or sequences of pre-recorded, typically digitized, voice. Prompts are presented to the caller through control of the call flows.

A class of telephony application creation environments employs a modularized approach whereby the basic elements (call flows, functions, prompts) are logically separated both at the time of creation and during execution. In particular, the call flows are maintained in an interpretative state table, functions reside in executable object code, and prompts reside in a database, such as, for example, Unisys' SPeech Interface to NAP, or SPIN, database.

Figure 1:
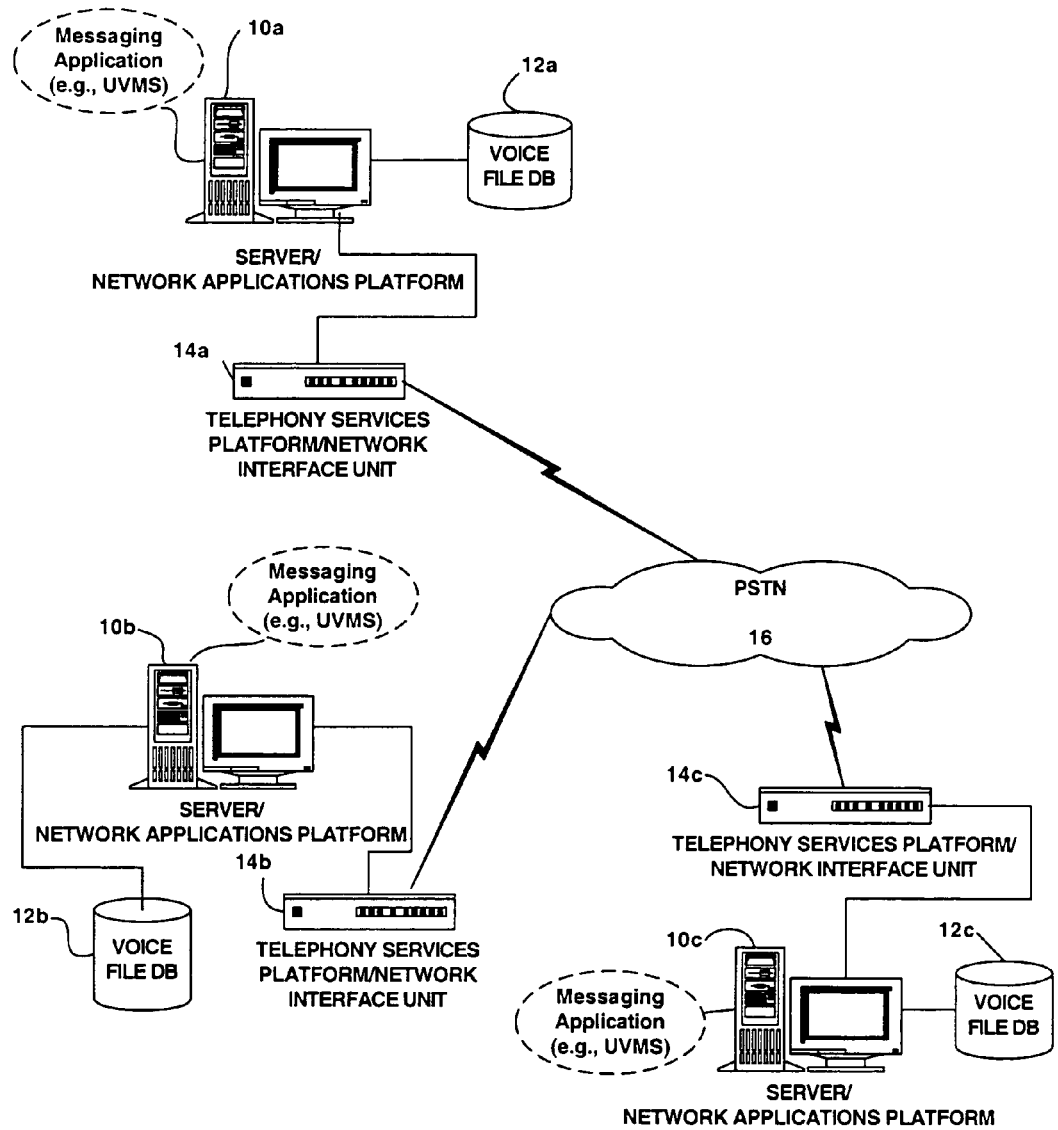
FIG. 1 schematically depicts a voice messaging system.
Figure 2:
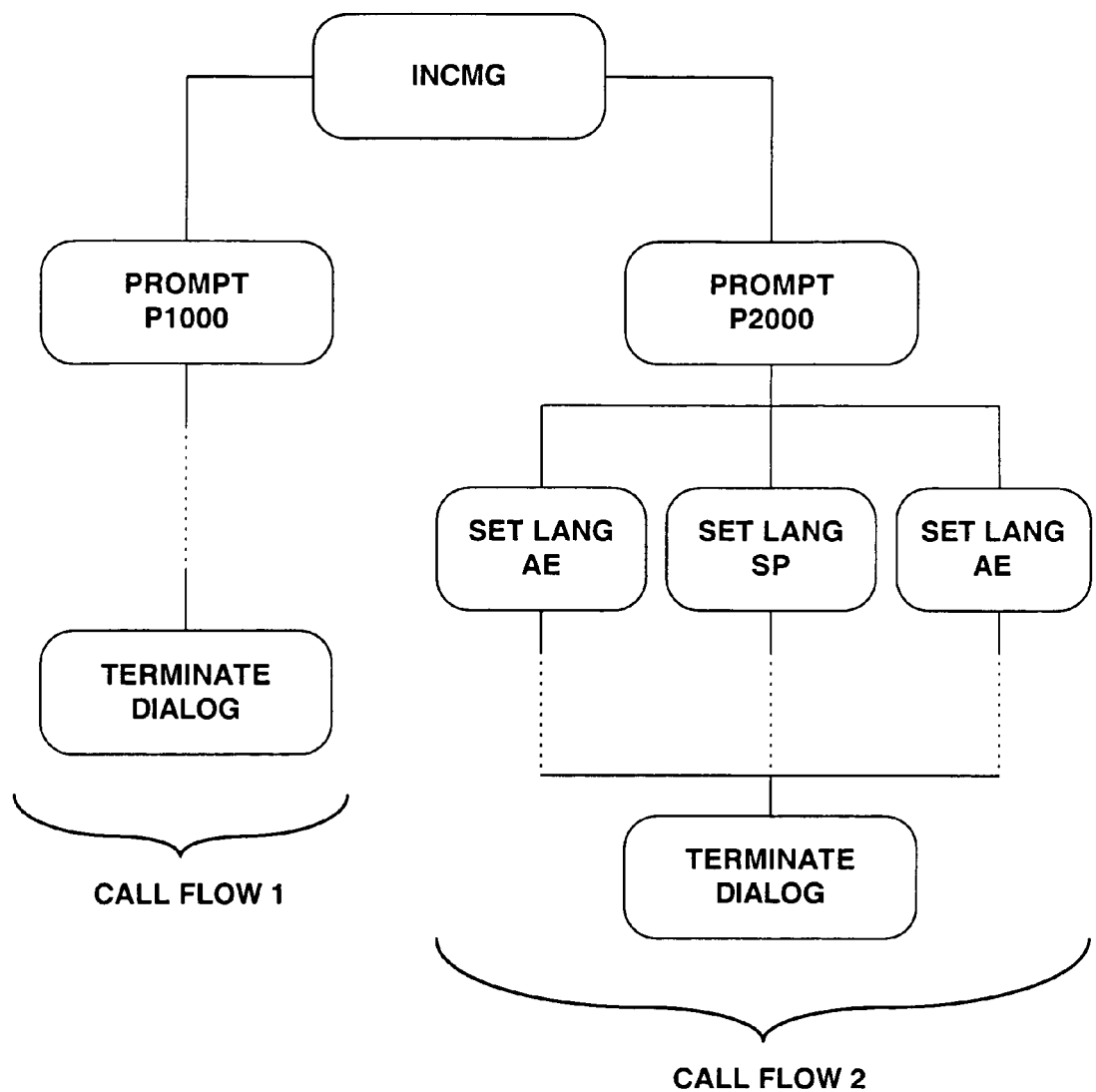
FIG. 2 depicts an exemplary set of call flows.

FIG. 2 illustrates the call flows of an exemplary network application that can be executed on a NAP-based system. In the example shown, the network application comprises two call flows—CALL FLOW 1 and CALL FLOW 2. CALL FLOW 1 might, for example, provide voice mail services, while CALL FLOW 2 might provide automated call answering services. Each box in FIG. 2 represents one call state.

On the NAP system, a network application developer can specify different call types to be handled by a network application. Each call type can be serviced by a different call flow and has a unique identifier associated with it. An Incoming Call (INCMG) state is the first call state in the network application. The INCMG call state identifies the type of call received by the NAP system and routes that call to the appropriate call flow of the application. In the example of FIG. 2, a first call type is routed to the voice mail call flow that has a call flow identifier of "001" (CALL FLOW 1 in FIG. 2), whereas a second call type is routed to the call answering call flow that has a call flow identifier of "002" (CALL FLOW 2 in FIG. 2). The different call types are specified in the network application, and they are also defined to the NAP system when the network application is installed and initialized on the system. Once the different call types have been defined, the NAP system is able to identify the different call types and to return the appropriate call flow identifier in the INCMG call state when a call is received, so that the call can be processed by the appropriate call flow. Each call processed by the NAP system is referred to as a "dialog."

At each subsequent call state in a call flow, some function is performed. In the example of FIG. 2 (i.e., a NAP-based system), a call flow can execute two kinds of function—core functions and custom functions. Core functions are pre-coded functions provided with the NAP system. These functions provide basic telephony services such as initiating a call, playing a voice prompt, collecting digits, and the like. Custom functions are application-specific functions that the application developer creates to perform functions not available using the core functions. For example, the application may require the retrieval of information from an application-specific database. Custom functions can be written in any programming language that the underlying computer system can execute, such as, e.g., LINC, ALGOL, COBOL, C or the like.

Referring to the example of FIG. 2, the voice mail call flow (CALL FLOW 1) proceeds to the first call state, at which the Play Prompt (PROMPT) core function is executed to play prompt number "P1000" to the caller. This prompt might, for example, play the following voice message: "You have <number> new messages—Press 1 to review, Press 2 for other options." Based on the user's selection, the call flow will then pass to a next state at which another function will be performed. Ultimately, the dialog established for this call will end at a call state that performs the Terminate Dialog core function.

When a call of type "002" is received, the call will be routed to CALL FLOW 2. At a first call state in CALL FLOW 2, the call flow might prompt the caller to "Press 1 to hear prompts in English, Press 2 to hear prompts in Spanish, or Press 3 to hear prompts in French." This time the Play Prompt core function (PROMPT) is combined with a Collect Digits function so that the NAP system will accept a caller's response. If the caller presses "1," the call flow will move to a call state where a Set Language core function is performed to set the active language to American English (SET LANG AE in FIG. 2). If the caller presses "2," the call flow moves to a call state where the Set Language core function is performed to set the active language to American English. If no key is pressed, or an invalid key is pressed, the call flow defaults to establishing the American English language as the default. The remainder of the call flow then proceeds until the dialog established for the call terminates. As the foregoing illustrates, the INCMG call state, in combination with defined call types, can be used to handle different types of calls within a single network application.

On the NAP system, network applications are created using two personal computer (PC) based applications—PC SPIN and PC NAPTool. PC SPIN is a modified form of the SPIN program described in commonly assigned U.S. Pat. No. 5,493,606, and is used by an application developer to create and modify sets of prompt definitions and related information required to expand and play prompts on the system. PC NAPTool is used by a network application developer to create and edit the call flows of a network application. Further details concerning the use of the PC SPIN and PC NAPTool programs to create a network application are provided in U.S. Pat. No. 5,493,606 and in co-pending application Ser. No. 08/944,924, filed Oct. 6, 1997, entitled "Enhanced Multi-Lingual Prompt Management In A Voice Messaging System With Support For Speech Recognition", and 08/964,744, filed Nov. 5, 1997, "Methods and Apparatus for Providing External Access to Executable Call Flows of a Network Application".

Once created, the files and information comprising a network application are transferred from the PC environment to the NAP system. An Installation Manager program takes the transferred information and installs it in appropriate files on the host computer of the NAP system. In particular, a representation of each call flow of the network application is stored in a file called CALLFLOWS. This file specifies the functions to be performed at each call state and the logic that controls the flow of execution from state-to-state. Another file, INSPARAM, contains certain Installation Parameters associated with the network application. Yet another file, CORE-DEF, provides certain default input parameters for certain core functions, particularly those that may require site-specific changes, and a still another file, CUSTATTR, contains attributes of all custom functions written for the network application.

A network application executes in a runtime environment on the NAP system. Multiple network applications can be installed and run on a single NAP platform, with each network application running in its own runtime environment. The runtime environment for a given network application includes a core function library that contains the executable code for each core function, and a custom function library that contains the executable code for each custom function written for the network application. Another interface provides access to custom functions written in the LINC programming language.

A primary component of the runtime environment is called the "agent." The agent is a software component that (i) performs and controls call flow execution (the next function to be executed is based on the result of the previous function), (ii) passes parameters to various functions, (iii) translates new dialog activity into call states, (iv) saves information from NAP responses for use during call flow execution, and (v) enters call flow information into memory-based state tables. Execution of a call flow by the agent is interpretive. The agent interprets the representation of the call flow contained in the CALLFLOWS file. At each call state, the agent invokes the specified core function or custom function from the appropriate library.

Network Applications Platform

U.S. Pat. No. 5,133,004, Jul. 21, 1992, titled "Digital Computer Platform for Supporting Telephone Network Applications," discloses a Network Applications Platform that may be used in connection with the present invention. The disclosure of this patent represents part of the background of the present invention, and thus is summarized below. The reader may review the patent itself for a complete description of the NAP. In addition, U.S. Pat. No. 5,323,450, dated Jun. 21, 1994, may be reviewed for background.

The variety of telephone services currently available include call answer, call forward, voice store and forward, voice-mail, emergency number facilities, directory assistance, operator assistance, call screening, and automatic wake-up services. Such services had generally been provided by dedicated systems specifically designed for the service and the hardware environment in which the system was to be deployed, which made the systems inflexible and expensive. Following divestiture, the Bell Operating Companies (BOCs) and Independent Telephone Companies (Telcos), in devising ways to increase the return on their installed telephone networks, began to offer new services that integrated into, or interfaced with, the existing network, resulting in greater utilization of the network. The invention disclosed in U.S. Pat. No. 5,133,004 made it easier for the BOCs and Telcos to provide new services by removing the dependence on the telephone switch provider in implementing these new services. In particular, the Network Applications Platform, or NAP, was designed to interface with the telephone network and support application software deployed by the BOCs and Telcos to provide services they wanted to offer.

The NAP is a digital computer platform that interfaces with the network and is programmed with software providing the telephone network functionality required to support the new service-related applications. Such functionality includes detecting and reporting an incoming call from the network, initiating an outgoing call to the network, receiving a voice message from the network, sending a voice message to the network, collecting digits entered from the network, switching calls between channels, terminating calls, and detecting and reporting call termination.

The NAP includes a database including a voice file for storing predetermined digitized voice and tone messages to be applied to the network and voice messages received from the network to be re-applied thereto. The NAP may be implemented, for example, on an enterprise or mainframe computer (e.g., an A Series™ or Clearpath™ computer system commercially available from Unisys Corporation). The NAP may be implemented so as to use the standard parallel I/O processing capabilities, the Data Management System II (DMSII) and disk storage facilities and Direct I/O, as well as the communications capabilities such as Communication Management System (COMS) and Data Communications (DATACOM) of the A Series™ system. The applications communicate with the NAP through message-passing communication apparatus, such as the COMS. The applications comprise a plurality of independent applications deployed by the telephone company to provide the desired services to the users.

The NAP includes three software modules collectively referred to as a Voice Network Management System (VNMS). The VNMS comprises an Application Interface Module (AIM), a Voice Message Management Module (VMMM), and a Network Interface Unit Manager (NIUM). The VNMS resides in main memory of the computer system on which the NAP is installed. The applications communicate with the AIM through the COMS via multiple dialogs, each representing a logically distinct sequence of related messages. The messages within each dialog occur in pairs, with each pair comprising an AIM Command from an application requesting the NAP to perform a function and a response from the AIM to the application with appropriate status information or data, such as keyed-in caller digits or message number identification tokens.

The AIM is the point of communication between the NAP and the application(s) and directs the functionality of the NAP. Under the direction of the AIM, the VMMM controls sending and receiving digital voice messages between the NAP and the network. The AIM also communicates with the NIUM to receive digits from the network, such as DTMF digits; to receive status signals from the network; and to control call switching at the interface between the NAP and the network.

The NAP interfaces with the network through one or more NIUs. Each NIU comprises a computer-controlled, digital matrix switch that communicates with the lines and trunks of the network. The NIUs communicate with the voice message portion of the NAP via ports over a communication link comprising a conventional T1 or E1 digital voice link or trunk.

Predetermined voice messages, such as service offering prompts and instructions to callers, are stored on disk. These messages are accessed by the applications via the VMMM and transmitted over a voice channel through selected ports in the NIU or TSP. Voice messages from callers are stored on disk for re-transmission to the network under control of appropriate applications. The NIUM selects and connects the ports of the NIU or TSP under command of the applications and the VMMM controls the flow of the digital voice messages.

Central Office (CO) switches include the capability of detecting a predetermined number of ring-back or busy tones with respect to an incoming call and switching the incoming line to an outgoing line predetermined by the telephone company. Thus, for applications such as Call Answer, the CO can switch the call to a telephone number in the address space of the CO, for routing the call to the NAP so that the appropriate application can provide the service. Other services such as voice-mail and voice-store and forward use appropriate access telephone numbers in the address space of the CO to connect to the desired service. Based on configurable translation of information, such as the incoming port address and telephone number or other information transmitted to the NAP by the CO, the NIUM determines the appropriate application to utilize.

With the above summary description of the NAP as background, we will now describe in greater detail an exemplary implementation of NAPTool Customization Enhancements in accordance with the present invention.

Exemplary NAPTool Customization Enhancements

Figure 3:
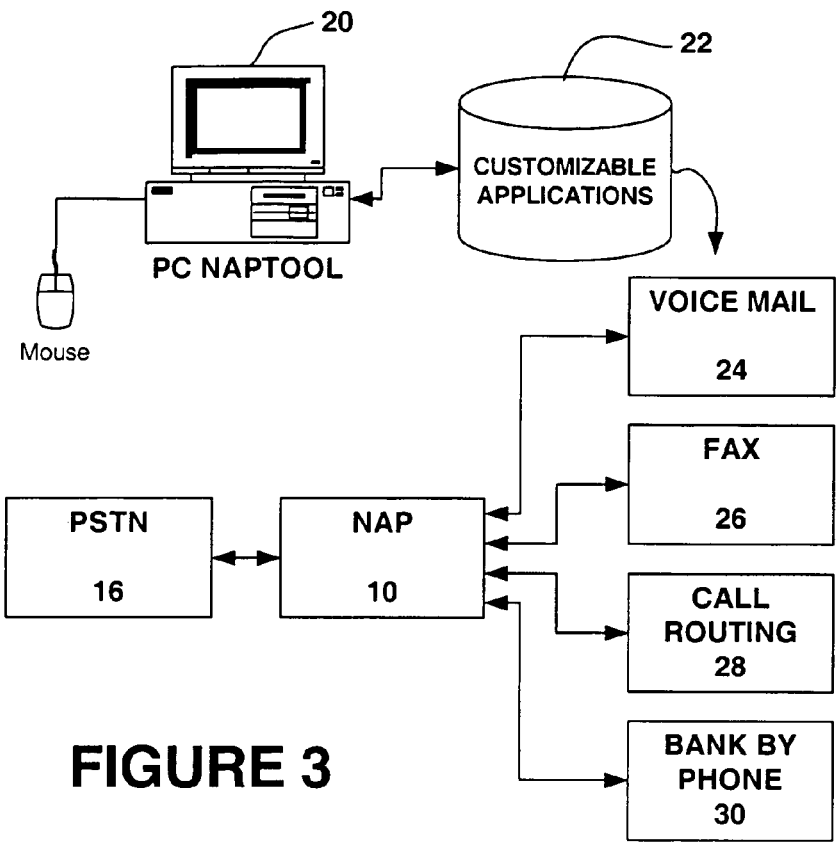
FIG. 3 illustrates, in a very simplified way, how a development environment, referred to as PC NAPTool, is used to develop messaging applications that can be executed in a NAP-based system.

As shown in FIG. 3, a system for carrying out the present invention may include a computer 20 running a program, such as PC NAPTool, for developing customizable applications, which may be stored in a storage medium 22, such as a magnetic medium (disk or tape) or an optical storage medium (CD ROM). Even a computer network could be considered the storage medium, so long as it provides a mechanism for distributing the applications to customers. The applications may include, e.g., voice mail 24, fax 26, call routing 28 and/or bank by phone 30 applications, or any other suitable messaging application that could be offered to a customer base.

As the customer base grows, more "clone" (custom) applications may need to be created from a "base" set of flows. Such customizations can be accomplished by copying the base flows to a new name and physically changing the call flows to match the requirements of the customer. Many of these changes will likely involve, and have involved, changing the key presses required by the user to perform certain functionality. Since the functionality remains identical in many situations, the process could be improved by making the key presses "soft" so as to allow the call flows to remain the same for many customers.

In accordance with the present invention, the concept of modules is leveraged to permit the developer to separate the user-customized portion of the flows from the non-customized portion of the code. A module is typically a set of code and call flows that perform a specific task. There are two types of modules that we will consider, Main and Service:

1. A Main Module commonly contains the code and call flows which are specific to a certain customer or customization.
2. A Service Module contains code and call flows used by many customers. Since Service Modules are used by multiple customers, it is important that the key presses be made customizable (and preferably external to the Service Module).

Our solution is to create customizable "key sets" which tailor a base set of flows to a particular customer. These key sets are known as "Customization Lists." The same module set can now be delivered to a customer with a customer specific key set. Using these Customization Lists, the amount of call flow changes needed to customize an application to a particular customer is significantly reduced. This approach will reduce the field support and code maintenance involved with supporting multiple customizations of the base product.

Figure 4:
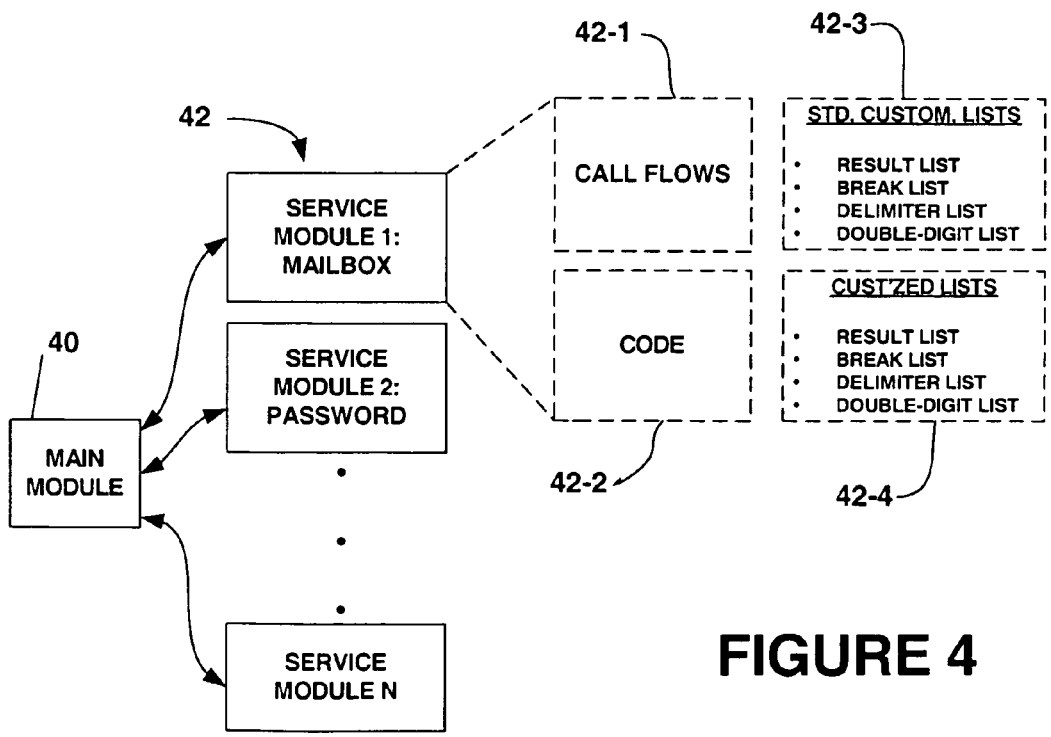
FIG. 4 schematically depicts the architecture of a messaging application comprising a Main module and a plurality of Service Modules, with one or more modules containing call flows, code and Customization Lists in accordance with the present invention.

FIG. 4 schematically illustrates the architecture of a messaging application in accordance with the present invention. As shown, the application includes a Main Module 40 and a number of Service Modules 42. Each Service Module includes call flows 42-1, code 42-2, one or more Standard Customization Lists 42-3 and one or more Customized Customization Lists 42-4. Each Customization List includes tables or lists of result names and digits, break names and digits, delimiter names and digits, and double-digit names and digits. In other words, each Customization List comprises a table with a list of names recognized by the development system and a modifiable list of corresponding DTMF signal identifiers (i.e., the telephone keys that a caller could press). As discussed, a particular customer is permitted to change the mapping between caller-entered DTMF signals and the corresponding actions taken by the messaging system by modifying the list of DTMF signal identifiers in the Customization List(s).

Before describing the Customization Lists in greater detail, it should be noted that a "project and build" process is preferably employed to provide the customizable applications to customers. This aspect of the present invention is described next.

Project and Build

Figure 5:
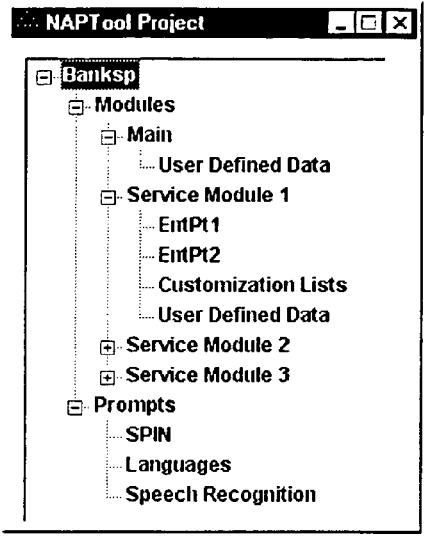
FIG. 5 depicts an exemplary screen display and is illustrative of the project and build concept of the present invention.
Figure 6:
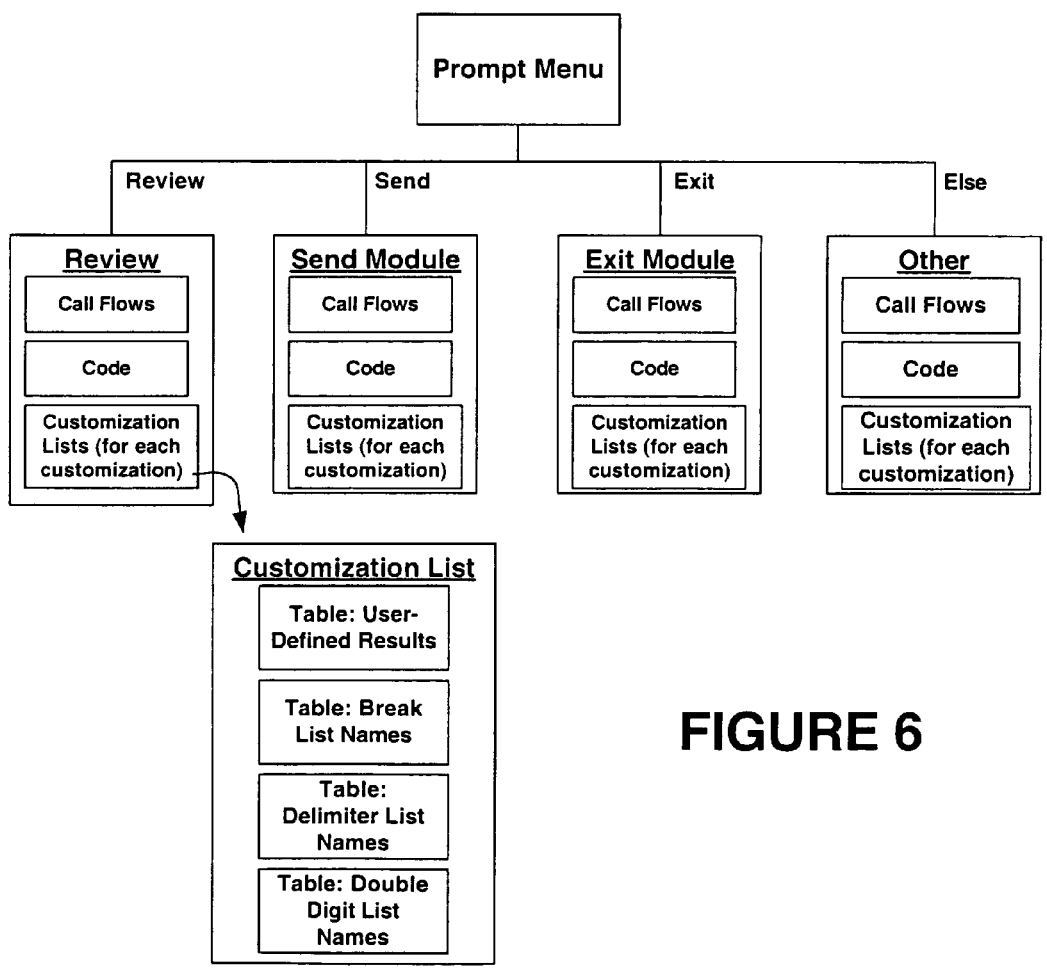
FIG. 6 illustrates an exemplary configuration of an application comprising a main menu and a group of modules (Review, Send, Exit and Other) that may be invoked by a caller, in accordance with a prescribed call flow.

A project is a container for organizing modules in order to build custom applications. In the PC NAPTool application, projects are organized in a hierarchical structure and contain the PC NAPTool elements necessary to create an application on the platform. An exemplary project window is shown in FIG. 5.

A project has a unique name (such as "Banksp" in FIG. 5) and contains the following module and prompt information.

One Main Module (or NAPToolMM) containing call flows that make the features of the project unique to a customer or, in the case of the "Standard" project, the standard features used as a base for all customizations. All projects have only one Main Module. Each Main Module contains its User Defined Data. User Defined Data is the field layouts for the module used for function I/O and storage.

Service Modules (or NAPToolSMs) (which are optional) contain common routines and multiple customizations to support projects. Each Service Module contains the entry points (EntPt) defined for the module, as well as the Customization Lists and User Defined Data for the module. As discussed, the Customization Lists are used to tailor the result, break, delimiter, and double-digit values for a particular customer.

Prompts—There is only one set of SPIN applications in a project. The SPIN applications are used globally by the project and are defined in the language table for the project. During development, this allows all modules in a project to "share" the same SPIN ID(s).

In the context of the PC NAPTool application, an application is preferably a single customized runtime entity, and is created or updated on the platform by the PC NAPTool build and transfer processes and Installation Manager's Install/Update processes. A project container holds the elements necessary to produce an application. A project includes modules and prompt information. PC NAPTool deals with projects.

In the development environment, the presently preferred implementation of the NAPTool project concept imposes certain requirements on the organization of the data as well as the menus, dialogs, and transfer process. Below is a summary of these requirements.

Directory Structure: Projects have a specific organized directory structure. This structure is maintained internal to NAPTool. There is no user interface.

Customization Lists: As discussed, the set of Customization Lists is used to tailor a set of call flows. The sets for all customizations reside in a single file. There is one file for each module. Since a NAPTool Service Module contains flows and code for all customizations that it encompasses, a NAPTool Service Module may have multiple sets of customization lists. In this case, there is one set for each customization supported. Since the set(s) of customization tables for a NAPTool Service Module are stored with the module, the module can be "built" independently. For instance, a developer can select a customization and "build" that Service Module for that customization. When a Project is built, the NAPTool Main Module and attached Service Module(s) can be built together.

The Application build process: The term "build" can be translated as "creating the files necessary to transfer the Project or pieces of the project to the platform." There are two types of builds. The first is the build process as it applies to a complete project, and the second as it applies to a piece of a project (NAPTool Main Module or Service Module). The complete project build process includes building the files for the Main Module and building or including all attached Service Modules (including nested Service Modules).

When building Service Modules as part of a project, two options are available: (1) The Service Modules may have their files created during the build based on the set of Customization Lists whose name matches the name of the project. (2) The project may use a pre-existing set of files for the module if the appropriate customization has been built previously.

To facilitate the efficient storage and gathering of the files for a particular application, the files follow naming conventions. Moreover, when built, all files for the appropriate application or module will be stored in a specific area of its directory structure. The application built on the PC is the current development "image" and will override any files located on the host during transfer time. In other words, the installation manager takes the image transferred from the PC and installs or updates the running system on the host.

Customization Lists

A set of Customization Lists is used to tailor a set of call flows to a particular purpose or for a particular customer. The set of all customization lists for a module are, preferably, stored in one file, since it is easier to maintain a module when all of its customizations are stored centrally. (An alternative to storing all customizations for a module in a single file is to store each customization in a different file.) Since a module contains flows and code for all customizations that it encompasses, a module may have multiple sets of customization lists. In this case there is one set for each customization supported.

A Customization List is a set of tables, with one table for each of the following:
  The Result List Names
  The Break List Names
  The Delimiter List Names
  The Double-Digit List Names Since the Customization Lists for a module are stored with the module, the modules can be built independently. For instance, a developer can select a customization and build a module for that customization. (The term build refers to the PC NAPTool process for creating the files for a service module or application. The build process includes the use of result tables and break, delimiter, and double-digit list names to create files for a specific customization.) A module for a specific customer is basically the standard module "compiled" with the appropriate Customization List. The output of this build or compile is a set of files that is loaded by the NAPTool Runtime Environment during application initialization.

Customization Lists should also be used in the Main module, in addition to Service Modules, since they provide a way to vary the build for feature packaging, ease of testing, etc. For example, a standard product could include multiple customizations with different features, and only the features that have been paid for by a given customer would be "turned on" in the version of the product provided to that customer. The value of a DTMF digit can be stored in one result list (where result refers to the component of a call state that determines the next call state in a call flow), break list or delimiter list rather than hard coded with every call state that references the result, break, or delimiter list. The use of Customization Lists can also simplify the migration of a Main module call flow to a newer version since the key presses are stored outside of the call flow.

Result Tables

In the past, many custom implementations have required changes to accommodate customer requests to use different key presses to represent different call flow paths. For example, the call flow for a main menu of a standard voice messaging application might include 1 for REVIEW, 2 for SEND, 3 for PERSONAL OPTIONS, etc., but a customer that does not support the SEND feature might want the key press 2 to represent, say, PERSONAL OPTIONS. To avoid key press changes to the call flows, the PC NAPTool Development Environment is enhanced so that call flow developers can specify result path names (instead of digits) on all core functions that collect digits. Developers then use a customization editor to provide a mapping between the specified result path names and the digits to be pressed for each menu option. (This mapping accommodates double-digit key presses, for example, "to scan, press one one.") The mapping between result path names and digits to press is known as a result table. Result tables allow the call flow developer to label a call flow branch using result path names instead of the actual digits to be pressed. When a customization requires different key presses to be used, the call flows do not have to change. Only the result table needs to be changed.

A result table is given a table name that can then be used in core functions that collect digits. A module has standard mapping for each result table and can have one or more customizations for each. Internally, table names are qualified by module so that the table names can be duplicated across modules.

The term "DTMF digits" refers to the digits 0-9#* on a telephone keypad, the double-digit combinations, as well as the letters representing DTMF tones. The user enters double-digit combinations by rapidly inputting the single digit twice. That is, the user would enter 11 for the double-digit combination "one-one".

The following is an example of a standard or default result table as it might be defined when initially creating a module:

Service Module: Mailbox

Standard Setting

| Table Name: Mailbox Options | |
| --- | --- |
| Result Path Name | DTMF |
| Send | 1 |
| Review | 2 |
| Quit | 3 |
| Help | 0 |

Below is a result table that has been modified for a particular customer to change the DTMF digit for Send to the double-digit 44 as well as disabling the Help path. In the following table, the keyword NULL means that the result path is not executed. It works as if the Help path had never been coded in the call flows.

Service Module: Mailbox

Customization for Client 1

| Table Name: Mailbox Options | |
|---|---|
| Result Path Name | DTMF |
| Send | 44 |
| Review | 2 |
| Quit | 3 |
| Help | Null |

Break, Delimiter, and Double-Digit Lists

The present invention provides a capability for break, delimiter and double-digit lists similar to that for result tables. The set of DTMF digits that interrupt or break a prompt, delimit a digit collection or are accepted as double-digit key presses in response to a menu prompt can be associated with a name. When a customization requires changes to the DTMF digits, the call flows do not have to change. Only the DTMF digits in the appropriate list need to be changed. This feature is available in both the main application and in service modules.

The developer can create names and assign different combinations of break, delimiter and double-digit sequences. The digits assigned to the of break, delimiter and double-digit list names can be modified for different customers, allowing for the customization of the DTMF input without changing the static names in the call flows. The names can be used in core functions that collect digits. Internally, the names are qualified by module so names can be duplicated across modules. A module has a standard setting for these names and can have one or more customizations. Break list names, delimiter list names, and double-digit list names are defined separately.

This is an example of break, delimiter and double-digit list names as they might be defined when initially creating a module. Note that the keyword ALL, when assigned to a break or delimiter list, means that all valid DTMF digits are assigned to the break or delimiter name.

Service Module: Password

Standard Setting

| Break List Names | |
|---|---|
| Name | DTMF |
| P133Break | ALL |
| P134Break | ALL |

| Delimiter List Names | |
|---|---|
| Name | DTMF |
| P133Delim | # |
| P134Delim | # |

| Double-Digit List Names | |
|---|---|
| Name | DTMF |
| MainMenu | 45 |
| RecordMenu | 45 |

The DTMF associations might be modified as follows for a particular customer:

Service Module: Password

Customization for Client 1

| Break List Names | |
|---|---|
| Name | DTMF |
| P133Break | 0123456789 |
| P134Break | ALL |

| Delimiter List Names | |
|---|---|
| Name | DTMF |
| P133Delim | 8 |
| P134Delim | # |

| Double-Digit List Names | |
|---|---|
| Name | DTMF |
| MainMenu | 45 |
| RecordMenu | 89 |

Note that the MainMenu for the Client 1 Customization will now accept "44" and "55" as double-digit menu selections.

Runtime Support for Service Modules

The basis for customization is focused on Service Modules. Service Modules have a procedure-like structure in call flows and custom function code. Each Service Module can represent a collection of service entry points. Each service within the module is represented with a service name where the service name is actually the starting call state of the service call flow. Each service entry point within the module can have an independent parameter area field format.

The NAPTool Runtime Environment is the platform for the support of the PC based customization methods described above. The NAPTool Service Modules provide the basis for customization at runtime because of the true independence of call flow code and the opportunity for feature based parameterization. For example, suppose the base voice mail product reviewed messages in a first-in-first-out (FIFO) order but for a specific client the LIFO (last-in-first-out) order is preferred. This could be accomplished with an input parameter to the service that dictates the message review order.

User Interface

Figure 7:
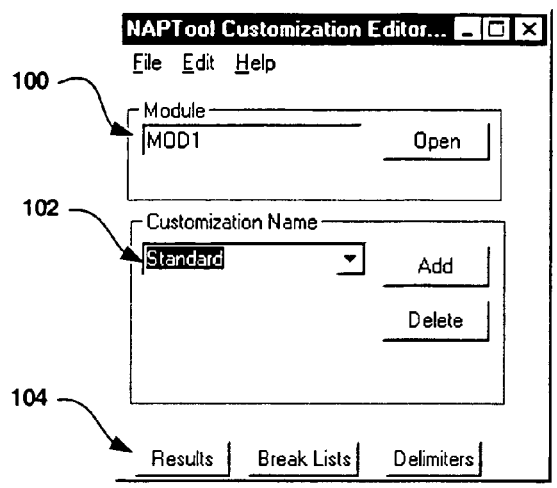
FIGS. 7-14 depict exemplary screen displays in accordance with a preferred user interface of the present invention.

The main customization editor dialog, depicted in FIG. 7, is used to create a customization set for each customer. Notice that these sets are created for module MOD1, as indicated in Module Name box 100, and that the customization name is "Standard," as shown in Customization Name box 102.

Figure 8:
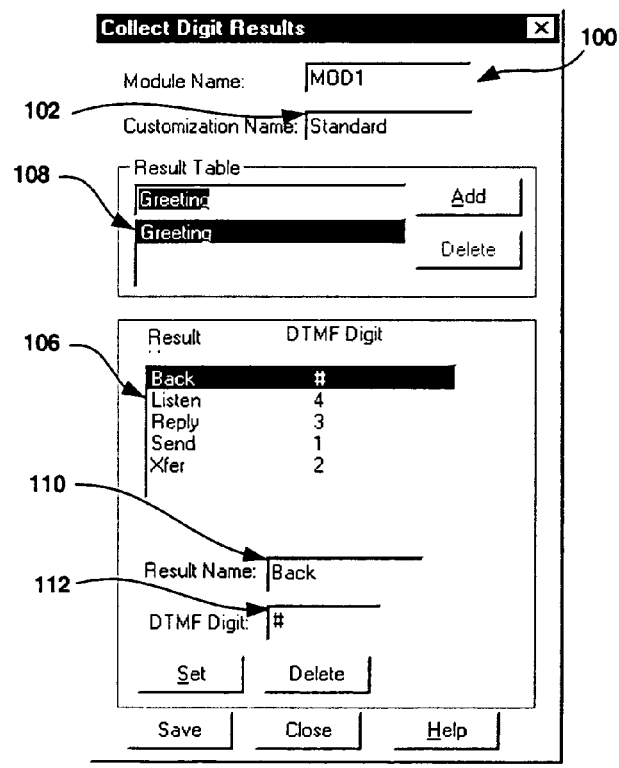
Figure 9:
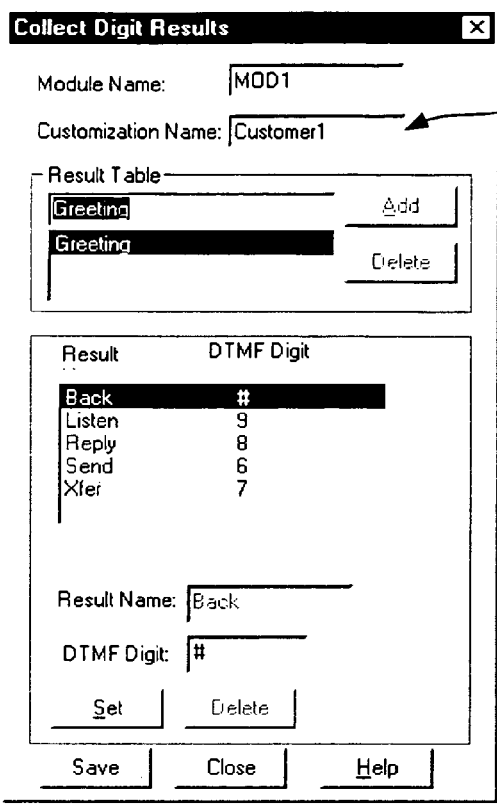
Figure 10:
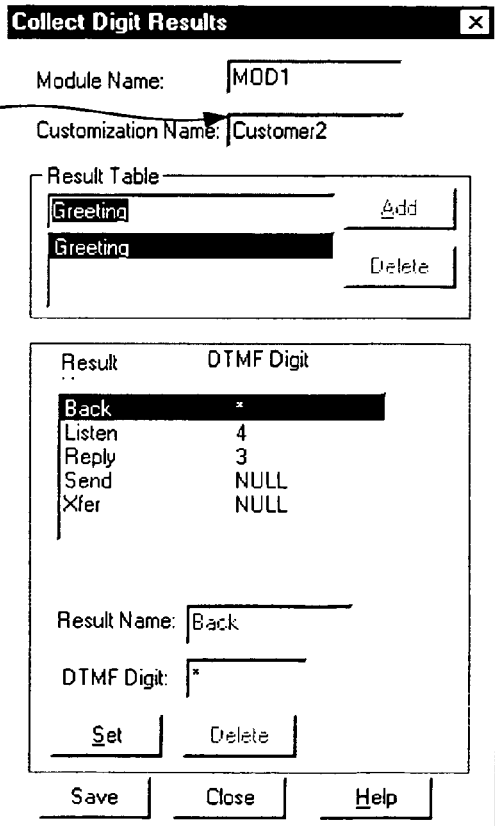

Pressing the "Results" button 104 for a particular set invokes the dialogs shown in FIGS. 8, 9 and 10. The dialog invoked for each customization name, as indicated in box 102, is included in these figures. Notice that each customization has the same set of mnemonics but different DTMF digits assigned, as shown in box 106. The dialog boxes of FIGS. 8, 9 and 10 also include a Result Table box 108, a Result Name box 110 and a DTMF digit box 112. A difference between FIGS. 8, 9 and 10 is the name in box 102, i.e., the customization name is "Standard" in FIG. 8, "Customer1" in FIG. 9 and "Customer2" in FIG. 10. In addition, the DTMF Digit box 112 contains # in FIGS. 8 and 9, and * in FIG. 10.

Figure 11:
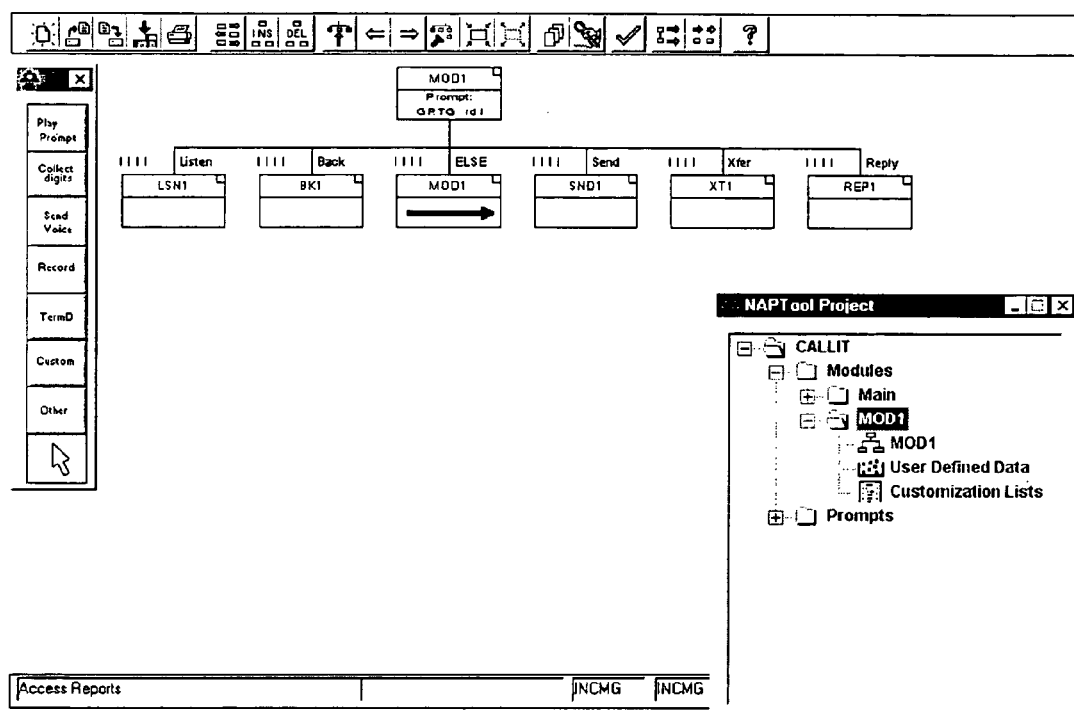

The flow display for the MOD1 module is shown in FIG. 11. Note that the results for the MOD1 state match the names used in the "Greeting" Customization List. (The ELSE result will handle any results not matching any of the specified result paths.) The customization file used when the module is built will determine which DTMF digit will actually invoke a particular result path. In this example, if the module is built using the Standard customization set, pressing "1" will caused the Send path to be executed. If the module is built using the Customer1 customization set, pressing "6" will caused the Send path to be executed and if the module is built using the Customer2 customization set, no DTMF digits are recognized for the Send path. In essence the Send path is invalid for this customization.

Figure 12:
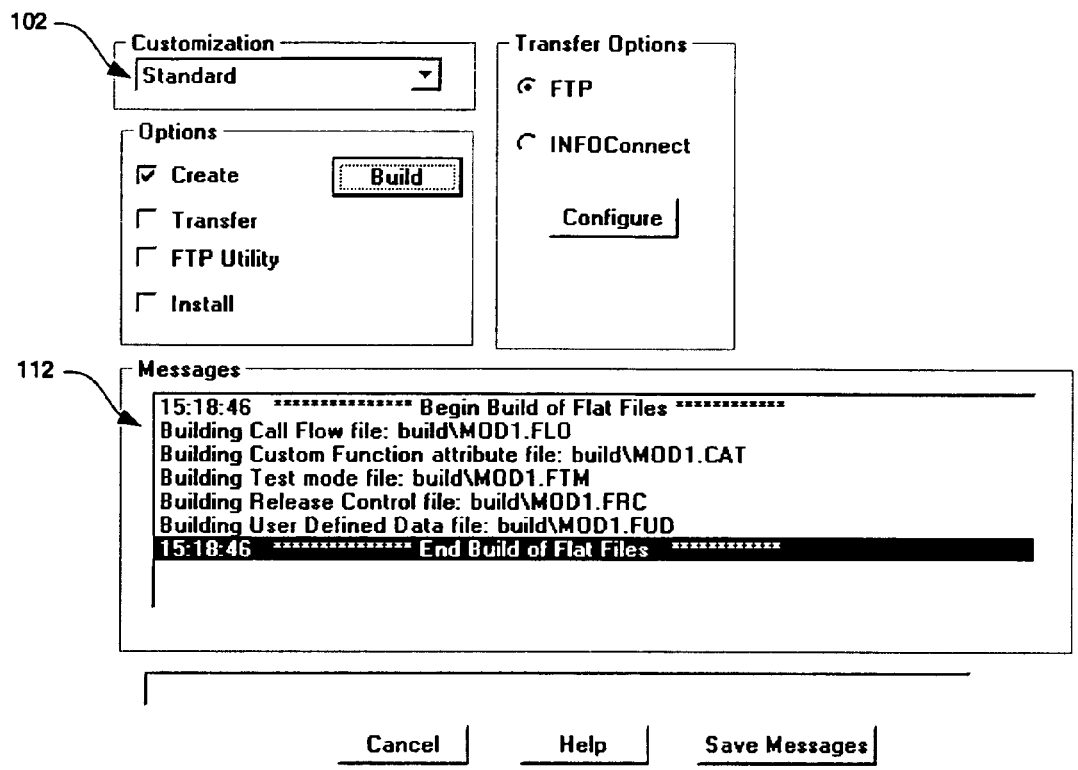

The build dialog for the MOD1 module is shown in FIG. 12. The customization set being used is the Standard set. The dialog box in FIG. 12 includes a Messages box 112, as shown. The flat file (FLO file) output for the Standard set is:

SMOD1 00030613;

☐

P40015S06GRTG; 0016S01; 0017S06MENU; 0003S12

☐

P40011S120123456789#*; 0002S010; 0004S0201; 0005D;

P40006D; 0073S17Greeting; 0064S01T; 0019S0200;

P10503V24042;

R4ELSE MOD1 IIII;▌ BK1 IIII;▌ LSN1 IIII;▌ REP1 IIII;

R2▌ SND1 IIII;▌ XT1 IIII;

Notice the mnemonics have been replaced by the DTMF values (bold) in the "Standard" customization table.

Figure 13:
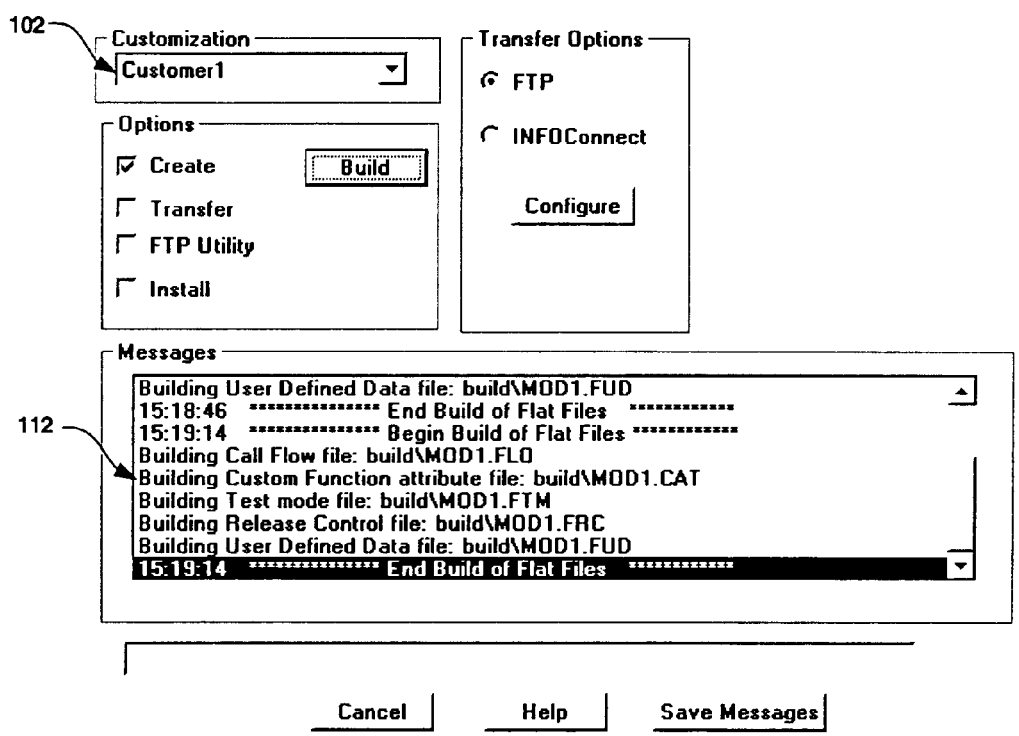

The build dialog for the MOD1 module shown in FIG. 13 corresponds to the Customer1 customization set. The flat file (FLO file) output for the Customer1 set is:

SMOD1 00030613;

P40015S06GRTG ;0016S01 ;0017S06MENU ;0003S12 ;

P40011S120123456789#*;0002S010;0004S0201;0005D;

P40006D;0073S17Greeting ;0064S01T;0019S0200;

P10503V24042;

R4ELSE MOD1 IIII;▌ BK1 IIII;▌ LSN1 IIII;▌ REP1 IIII;

R2▌ SND1 III;▌ XT1 IIII;

Notice the mnemonics have been replaced by the DTMF values (bold) in the "Customer1" customization table.

Figure 14:
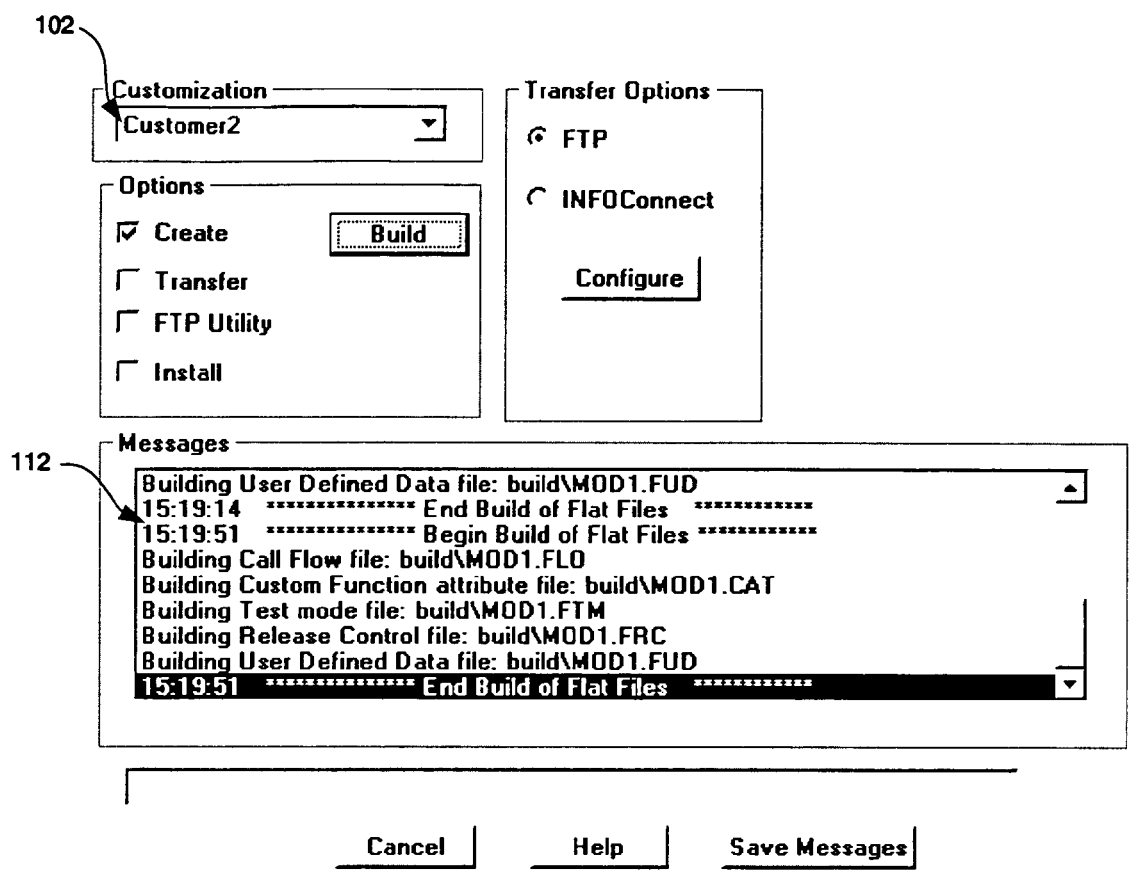

The build dialog for the MOD1 module shown in FIG. 14 corresponds to the Customer2 customization set. The flat file (FLO file) output for the Customer2 set is:

SMOD1 00030613;

P40015S06GRTG ;0016S01 ;0017S06MENU ;0003S12

P40011S120123456789#*;0002S010;0004S0201;0005D;

P40006D;0073S17Greeting ;0064S01T;0019S0200;

P10503V24042;

R4ELSE MOD1 IIII;▌ BK1 IIII;▌ LSN1 IIII;▌ REP1 IIII;

R2▓▓▓ SND1 IIII;▓▓▓ XT1 IIII;

Notice the mnemonics have been replaced by the DTMF values (bold) in the "Customer2" customization table. The NULL results are results that are effectively "inactive" for this customer. These paths will never be taken. This can be used to disable features for certain customers. These features may be extra "billable" features or features which are used by one customer but not by another.

CONCLUSION

In sum, the present invention provides a method, system and software product for constructing a voice messaging application in such a way as to make it easily and efficiently customizable. It is understood, however, that the invention is susceptible to various modifications and alternative constructions. It should be understood that there is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of messaging applications, including telephony-based voice mail applications. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a magnetic or optical storage medium or device (e.g., magnetic disk or CD ROM). Of course, the storage medium is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

We claim:

1. A telephony-based messaging system application stored on a computer readable medium for use by a particular customer, comprising:
    a module comprising call flow functions, code and a customization list;
    wherein the customization list comprises a table with a list of names and a modifiable list of corresponding DTMF signal identifiers, whereby the particular customer is permitted to change the mapping between caller-entered DTMF signals and the corresponding actions taken by the messaging system by modifying the list of DTMF signal identifiers.

2. A telephony-based messaging system application as recited in claim 1, and further comprising a main module comprising code and call flow functions that are specific to the particular customer.

3. A telephony-based messaging system application as recited in claim 1, wherein the customization list comprises a set of tables, with one table for each of the following: result list names, break list names, delimiter list names and double-digit list names.

4. A telephony-based messaging system application as recited in claim 3, wherein a result list name refers to a component of a call state that determines the next call state in a call flow.

5. A telephony-based messaging system application as recited in claim 3, wherein a break list name refers to a component of a call state that effects a stoppage of a prompt.

6. A telephony-based messaging system application as recited in claim 3, wherein a delimiter list name refers to a component of a call state that determines the end of a caller input string.

7. A telephony-based messaging system application as recited in claim 3, wherein a double-digit is a sequence of two DTMF tones that a caller enters within a predetermined period, and wherein a double-digit list name refers to a menu in which the corresponding double-digit sequence is recognized as a single result.

8. A telephony-based messaging system application as recited in claim 1, wherein the module is susceptible to being independently built into a set of flat files that can be loaded during an application initialization process.

9. A telephony-based messaging system application as recited in claim 1, wherein the customization list includes a standard customization table and a customized customization table derived from the standard table.

10. A telephony-based messaging system application as recited in claim 1, wherein the module is a main module that contains call flow functions and code that are specific to the particular customer.

11. A telephony-based messaging system application as recited in claim 1, wherein the module is a service module that contains call flow functions and code that are used by multiple customers.

12. A telephony-based messaging system application as recited in claim 1, wherein the storage medium is a computer readable magnetic storage medium.

13. A telephony-based messaging system application as recited in claim 1, wherein the storage medium is a computer readable optical storage medium.

14. A telephony-based messaging system application as recited in claim 1, wherein the storage medium is a computer network.

15. A telephony-based messaging system application as recited in claim 1, wherein the application is a voice and/or fax mail application.

16. A telephony-based messaging system application as recited in claim 1, wherein the application is a bank by phone application.

17. A telephony-based messaging system, comprising:
a computer;
a network interface unit coupling the computer to a telephone network;
a network applications platform (NAP) running on the computer; and
a messaging application comprising a module containing call flow functions, code and a customization list, wherein the customization list comprises a table with a list of names and a modifiable list of corresponding DTMF signal identifiers, whereby a customer is permitted to change the mapping between caller-entered DTMF signals and the corresponding actions taken by the messaging system by modifying the list of DTMF signal identifiers.

18. A telephony-based messaging system as recited in claim 17, wherein the messaging application further comprises a main module comprising code and call flow functions that are specific to the particular customer.

19. A telephony-based messaging system as recited in claim 17, wherein the customization list comprises a set of tables, with one table for each of the following: result list names, break list names, delimiter list names and double-digit list names.

20. A telephony-based messaging system as recited in claim 17, wherein the module is susceptible to being independently compiled into a set of flat files that can be loaded during an application initialization process.

21. A telephony-based messaging system as recited in claim 17, wherein the customization list includes a standard customization table and a customized customization table derived from the standard table.

22. A telephony-based messaging system as recited in claim 17, wherein the module is a main module that contains call flow functions and code that are specific to the particular customer.

23. A telephony-based messaging system as recited in claim 17, wherein the module is a service module that contains call flow functions and code that are used by multiple customers.

24. A telephony-based messaging system as recited in claim 17, wherein the application is a voice and/or fax mail application.

25. A telephony-based messaging system as recited in claim 17, wherein the application is a bank by phone application.

\* \* \* \* \*